United States Patent
Yi

(10) Patent No.: US 10,821,885 B2
(45) Date of Patent: Nov. 3, 2020

(54) ENHANCED VEHICLE SAFETY SYSTEM

(71) Applicant: Yong Guk Yi, Corona, CA (US)

(72) Inventor: Yong Guk Yi, Corona, CA (US)

( * ) Notice: Subject to any disclaimer, the term of this patent is extended or adjusted under 35 U.S.C. 154(b) by 0 days.

(21) Appl. No.: 16/734,332

(22) Filed: Jan. 4, 2020

(65) Prior Publication Data
US 2020/0139881 A1    May 7, 2020

Related U.S. Application Data

(63) Continuation-in-part of application No. 15/958,335, filed on Apr. 20, 2018.

(51) Int. Cl.
| | | |
|---|---|---|
| *B60Q 1/50* | (2006.01) | |
| *B60Q 1/44* | (2006.01) | |
| *B60Q 1/00* | (2006.01) | |
| *B60R 16/03* | (2006.01) | |
| *B60Q 1/26* | (2006.01) | |
| *B60R 1/12* | (2006.01) | |

(52) U.S. Cl.
CPC ........... *B60Q 1/442* (2013.01); *B60Q 1/0017* (2013.01); *B60Q 1/2696* (2013.01); *B60R 1/1207* (2013.01); *B60R 16/03* (2013.01); *B60Q 2900/30* (2013.01)

(58) Field of Classification Search
CPC ..................................... B60Q 1/442
USPC .......... 340/467, 463, 435, 437, 438, 426.16, 340/541, 988; 381/86, 87, 122
See application file for complete search history.

(56) References Cited

U.S. PATENT DOCUMENTS

| | | | |
|---|---|---|---|
| 2002/0004416 A1* | 1/2002 | Baratono | H04M 1/6075 |
| | | | 455/569.2 |
| 2015/0002262 A1* | 1/2015 | Geerlings | G07C 9/00309 |
| | | | 340/5.25 |

* cited by examiner

*Primary Examiner* — Tai T Nguyen
(74) *Attorney, Agent, or Firm* — Alexander Chen, Esq.

(57) ABSTRACT

A system to enhance vehicle safety is disclosed comprising a vehicle having a front end and a rear end; at least one visual signal light apparatus positioned in the proximity to the front end of the vehicle; the visual signal light apparatus illuminates when the vehicle's is decelerating via its braking system; wherein the visual light apparatus is comprised of a rear view mirror having a first surface facing the front of the vehicle and a second surface facing the rear of the vehicle wherein at least one portion of solar panel is embodied to the first surface and at least one or more LED lights is embodied to the first surface.

4 Claims, 13 Drawing Sheets

ENHANCED VEHICLE SAFETY SYSTEM

FIELD OF INVENTION

The present invention relates generally to vehicle safety features, and more specifically to enabling forward facing brake light indicators with minimal impact on the interior aesthetics of a drivers vehicle.

BACKGROUND

Recent years have seen the incorporation of a variety of automated safety features incorporated into vehicles. Nearly all of these safety features are focused on the safety and protection of the vehicle's passengers. While airbags, proximity sensors, and cameras are now commonplace, currently existing technology is easy to dismiss and has not been revisited to see what improvements might be made. Namely warning lights system development has been stagnant and deserve a revisit given the new developments in the technology and the new ways many people are now using their automobiles, communication of a driver's intentions to those around them seems to be still completely forgotten or ignored by vehicle manufactures.

While it has become conventional and even mandatory for vehicles to be sold with preinstalled tail-lights which indicate to those behind the vehicle the intentions of the driver, the information as to the whether or not the brake is engaged is not information that is communicated to those in front of the vehicle.

Any driver can attest that despite the teachings of driving school, navigating amongst pedestrians in a parking lot or determining who was first to an unsignaled intersection has led to many near collisions. Worse still, is this lack of communication has undoubtedly resulted in actual collision and unfortunately injury and death.

Defensive driving and predicting another party's intentions, while valuable to any driver, can still be augmented and enhanced with additional information.

It is clear that it is both valuable and necessary for a driver to be able to indicate those in front of his or her vehicle that the brake is engaged, and that the vehicle is at a complete stop. Enabling such a system would eliminate many accidents and the uncertainty that pedestrians face in parking lots and cross walks.

That said, todays driver is already bombarded with all sorts of information, such that it is desirable to incorporate new safety features with minimal impact on the console, such that by introducing a new safety feature, the device isn't then contributing in another way to distract the driver defeating the goal of safety.

Additionally, with many of todays drivers becoming increasingly dependent on GPS navigation, many manufacturers have begun to incorporate these GPS systems into vehicles. That said, many people cannot afford these premium features and instead elect to use their smart phones. Many manufacturers elect to develop their own navigation and/or operating system, which often does not function as well as these cell phone navigation services, such that many people do not use these manufacture installed options. As such, it is increasingly a problem with drivers attempting to use their phones and nav systems while their vehicle is in motion.

This problem of driver distraction and "cabin clutter" has been exasperated with the advent and explosion of ride services like Uber and Lyft which require drivers to not only have access and use of their smart phone to pick up riders, but also require the driver to put all manners of non-standardized signage on the dash and/or window to display to customers that they are a part of the ride-sharing service.

Many of these drivers work for multiple services to maximize their own income potential such that it is not uncommon to see a driver with multiple placards, light up signage, stickers, or otherwise on their dash, windshield, and the like.

Further, many car owners are very particular of the interior aesthetic of their vehicle and minimal impact design is becoming more desired these days.

As such, it is desirable to consolidate this communication to drivers, passengers, fares awaiting pickup into a single system that can indicate information while being low impact on the interior aesthetic of the cabin.

It is contemplated that in some embodiments such a system could even factor in the precision of the proximity, distance, location, and CPU information that a vehicle is calculating in real-time, and in the event of driver failure, self-activate and attempt to warn those in the vicinity of the vehicle.

In other embodiments, it is considered that such an invention could accommodate additional desirable features such as vehicle location, battery backup, smart device docking and charging, or the inclusion of a screen that is visible to passengers that communicates more specific ride-share type functions that will be discussed below.

Such a system is now no longer out of reach of economic feasibility to create and implement in new vehicles, and as an aftermarket addition to vehicles that are already in service. Further, the state of the current technology would allow for such a system to be installed potentially with minimal intrusion. With wireless connectivity now common, inexpensive, and increasingly dependable, a user of the contemplated invention would be able to install it with minimal effort. Further, such a system could become a hub of sorts, whereby a user might be able to configure and customize the features of the system wirelessly.

OBJECTIVE OF THE INVENTION

It is an object of this invention to provide a forward facing brake light which is directed by a master brake control system such that it can be easily communicated to those in the front of a vehicle that the brakes are engaged.

It is an additional object of this invention to enable a master brake control system such that in addition to the driver's manual input, gps, cpu, Bluetooth, and proximity, distance, and other similar sensors may provide valuable input such that the front facing brake lights may be activated when context dictates it is appropriate to do so.

It is an additional object of this invention to consolidate the multi types of ride-share signage currently seen in the market to a standardized location that is unobtrusive for the driver and allows for valuable and pertinent information to be communicated to fares waiting pickup and riders.

It is an additional object of this invention to make it wireless and easy to install such that unexperienced consumers will feel comfortable installing the device as mass adoption means safer roads for all. Further, wireless installation would allow for vehicles currently in service to be retrofitted with the invention with ease and speed.

It is further an object to provide a brake light indicator assembly which may be externally powered independent of the vehicles power supply but may operate as an auxiliary battery if so connected and enabled.

It is further an object to provide a brake light indicator assembly which conforms to current materials and manufacturing thresholds that the automobile industry self imposes and that the United States DOT demands.

It is further an object of this invention to provide for information to be communicated through it such that a driver can leave their smart phones on their person or docked and instead reference the invention for directions and other like information.

SUMMARY OF THE INVENTION

A system to enhance vehicle safety is disclosed comprising a vehicle having a front end and a rear end; at least one visual signal light apparatus positioned in the proximity to the front end of the vehicle; the visual signal light apparatus illuminates when the vehicle's is decelerating via its braking system; wherein the visual light apparatus is comprised of a rear view mirror having a first surface facing the front of the vehicle and a second surface facing the rear of the vehicle wherein at least one portion of solar panel is embodied to the first surface and at least one or more LED lights is embodied to the first surface.

In another aspect of the invention, a system to enhance vehicle safety, comprising a vehicle having a front end and a rear end; at least one visual signal light apparatus positioned in the proximity to the front end of the vehicle; the visual signal light apparatus illuminates when the vehicle's is decelerating via its braking system; wherein the visual light apparatus is comprised of a first body portion wherein the first body portion is comprised of a convex body having a first surface facing the front of the vehicle and a second surface facing the rear of the vehicle a third surface facing the top of the vehicle and a firth surface facing the bottom of the vehicle wherein at least one or more LED lights is embodied to the first surface and at least one or more solar panels is embodied to the third surface; wherein the visual light apparatus is comprised of a second body portion wherein the second body portion is comprised of a mount suitable to mount the first body portion to a dashboard of the vehicle.

In yet another aspect of the invention, a system to enhance vehicle safety, comprising a vehicle having a front end and a rear end; at least one visual signal light apparatus positioned in the proximity to the front end of the vehicle; a traffic sign having a transmitter and transmits continuous electrical signals; the visual signal light apparatus having a receiver; the visual signal light apparatus illuminates when the vehicle approaches the traffic sign and the visual signal light apparatus having a receiver receives the continuous electrical signals. In one embodiment of the invention, the visual signal light is comprised of a power source and a wireless connection module wherein the visual signal light is controlled by the vehicle via the wireless connection module. In one embodiment of the invention, the vehicle is comprised of a central processing unit capable of controlling vehicle functions. In one embodiment of the invention, the visual signal light is comprised of a power source and a wireless connection module wherein the visual signal light is controlled by a smartphone via the wireless connection module.

BRIEF DESCRIPTION

The present invention will be understood and appreciated more fully from the following detailed description taken in conjunction with the drawings in which.

Figure 1:
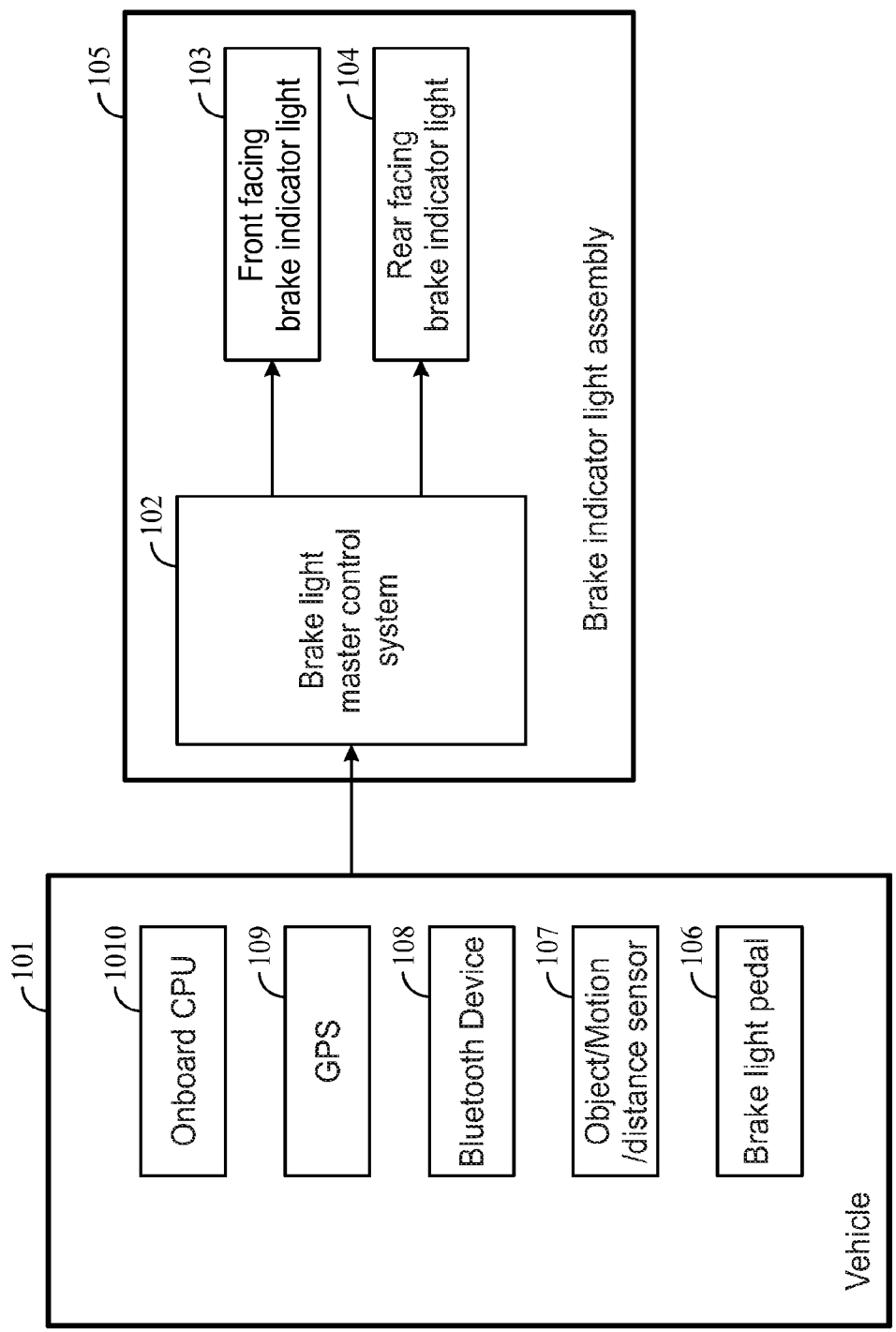
FIG. 1 is a system diagram illustrating the present invention wherein the diagram discloses the apparatus of the present invention comprising a brake light master control system and a front facing brake indicator light.
Figure 7:
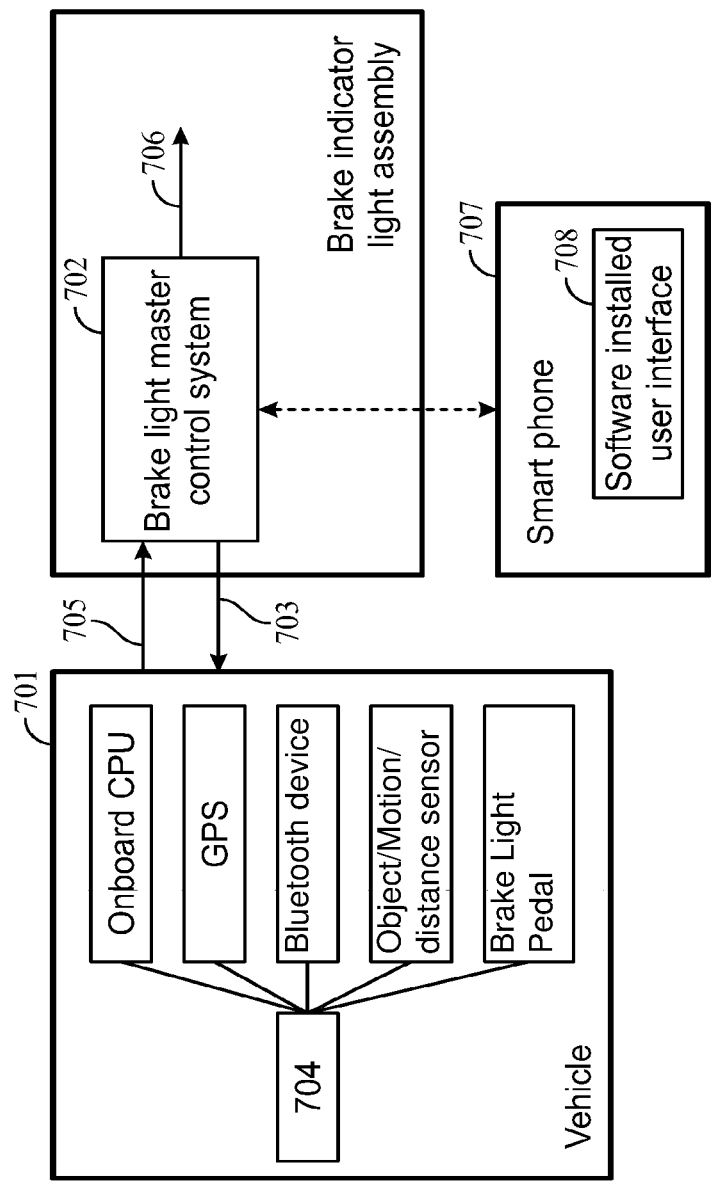

FIG. 7 is a system diagram of FIG. 1. where the brake indicator light assembly further includes the addition of external smart phone connectivity whereby by way of a software interface on the user's smart phone, a user may interact directly with the brake light master control system and control the respective settings for the described system. In turn, the brake light master control system, in a preferred embodiment would also be able to interact with the onboard car GPS as well as the other electronic sensors and systems to allow further tuning and customization.

Figure 8:
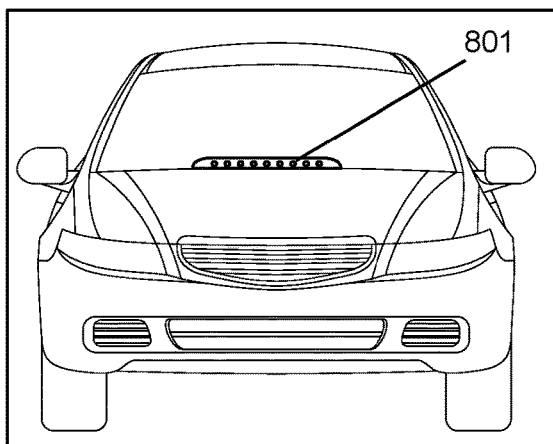
Figure 8:
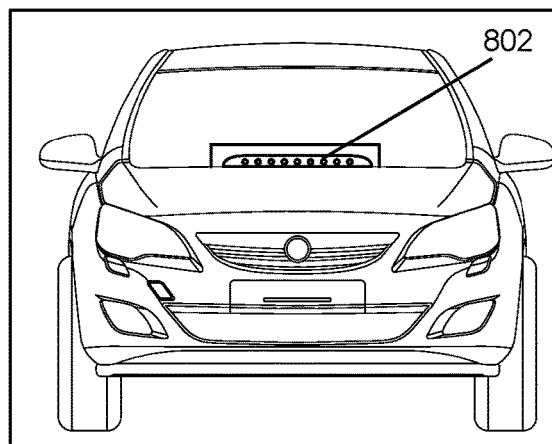
Figure 8:
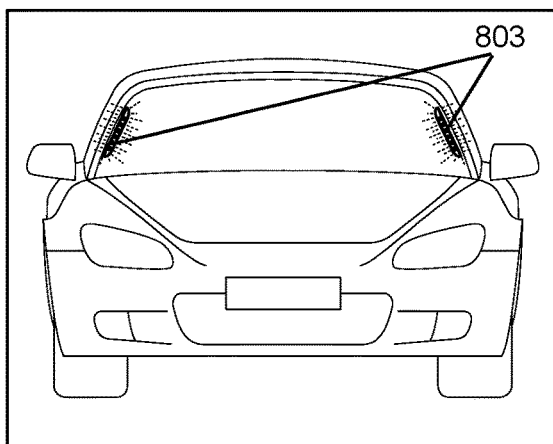
Figure 8:
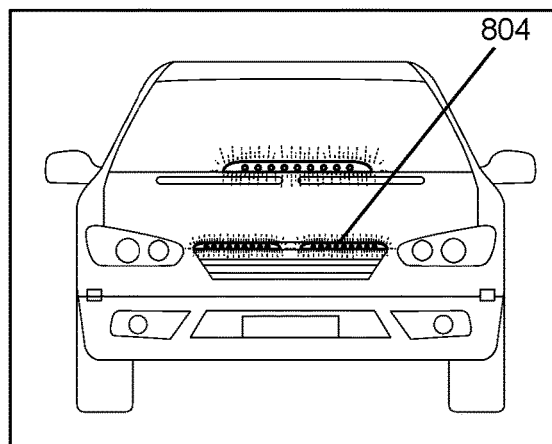
Figure 8:
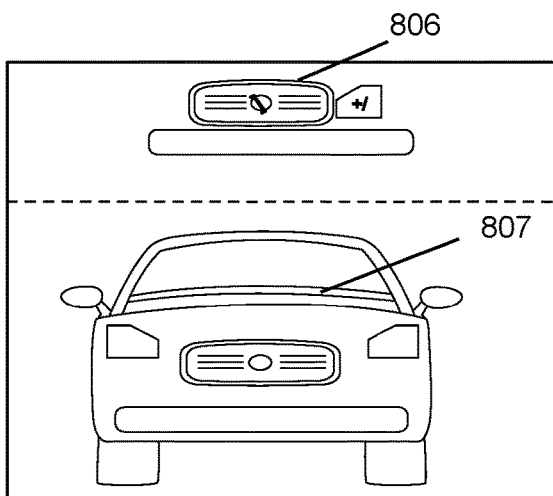
Figure 8:
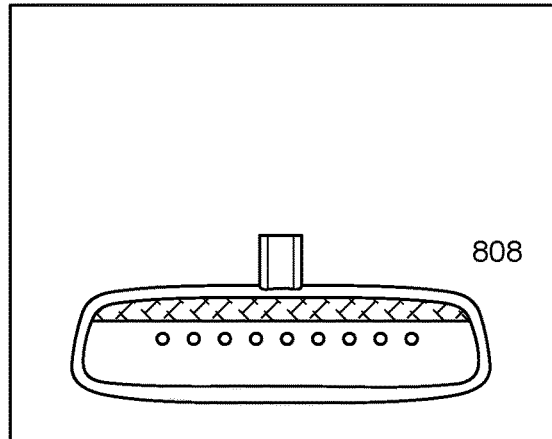

FIG. 8 is a pictorial illustration of contemplated positioning of the front facing brake indicator light or lights in accordance with an embodiment of the present invention as seen from the exterior of the vehicle.

Figure 9:
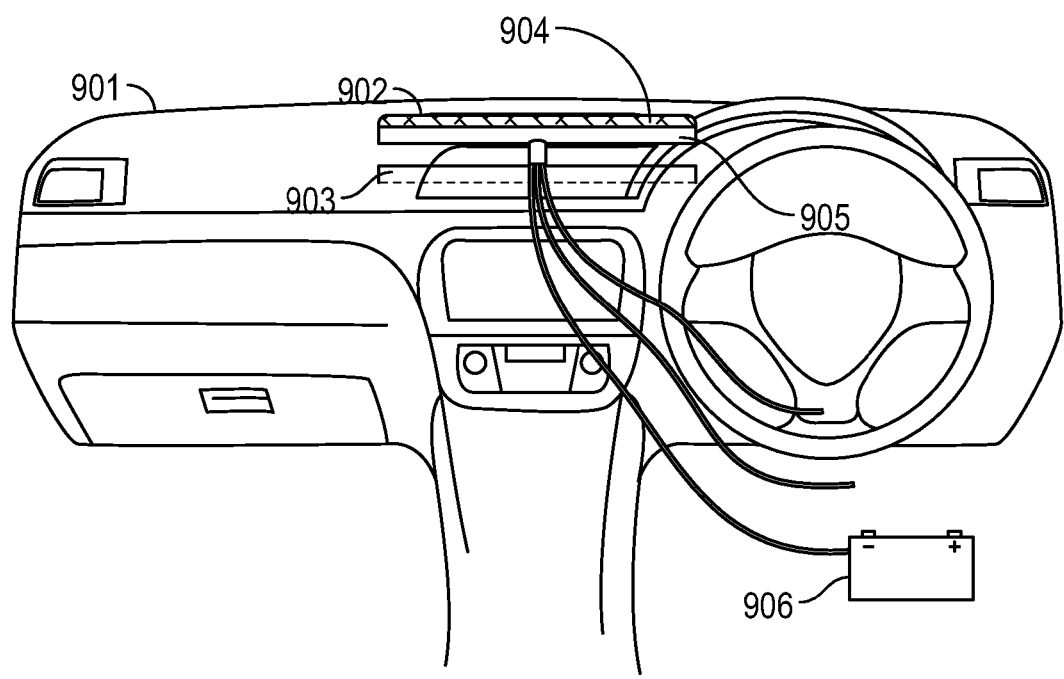
Figure 9:
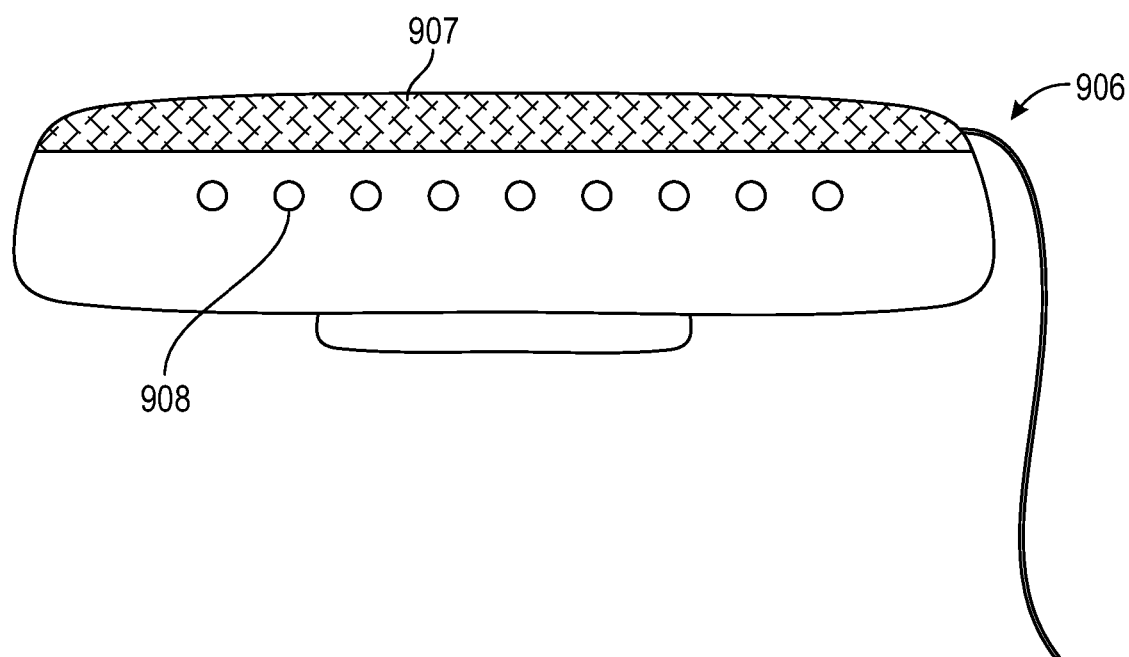

FIG. 9 is a pictorial illustration of an embodiment of the present invention that indicates the relative location of the invention on the dashboard and describes additional contemplated functionality whereby the invention is built into the dashboard by the manufacturer is able to raise and lower.

Figure 10:
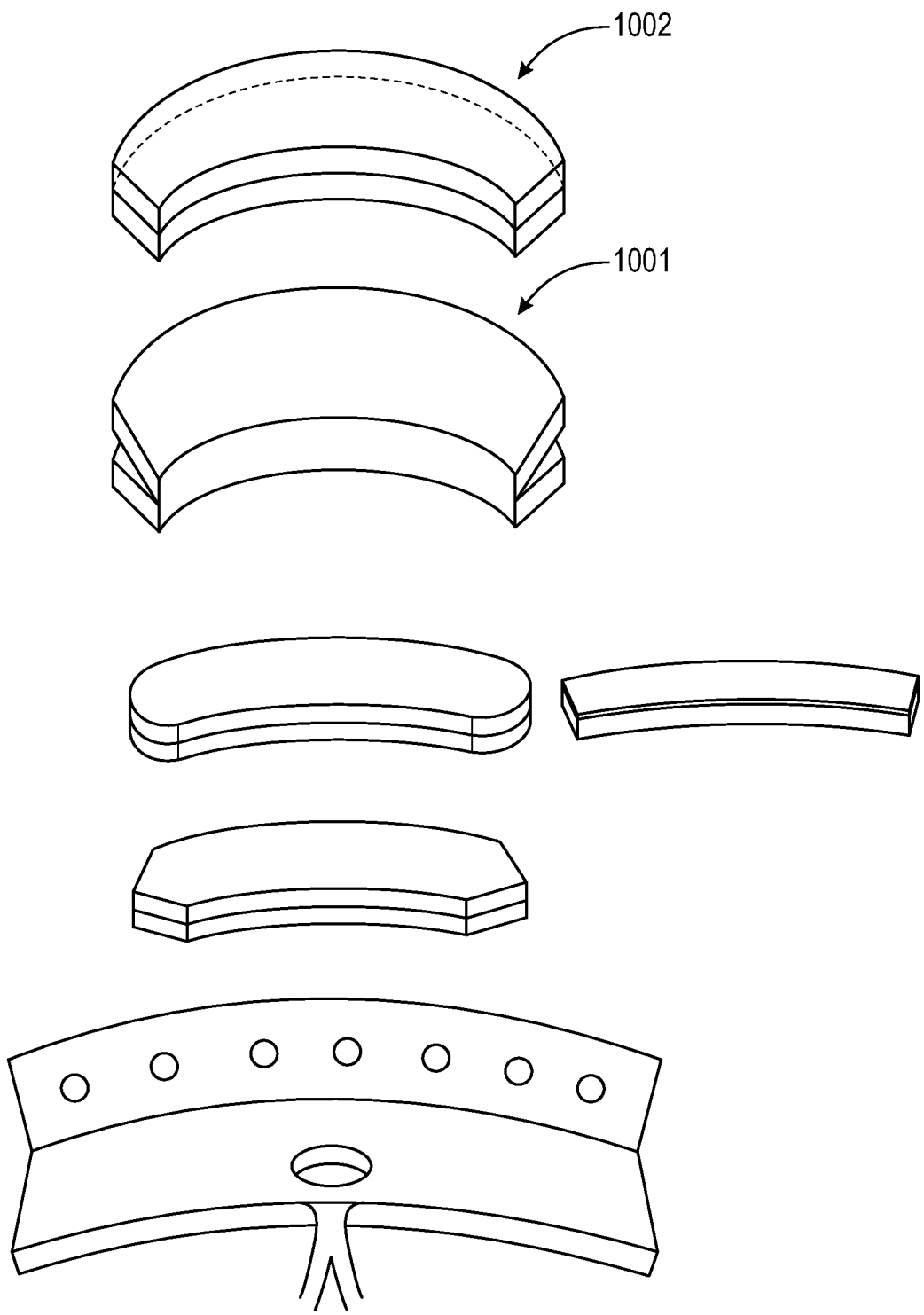

FIG. 10 is a pictorial illustration of an embodiment of the present invention that indicates the relative location of the invention on the dashboard and describes additional contemplated functionality whereby the invention is built into the dashboard by the manufacturer is able to flip open and shut.

Figure 11:
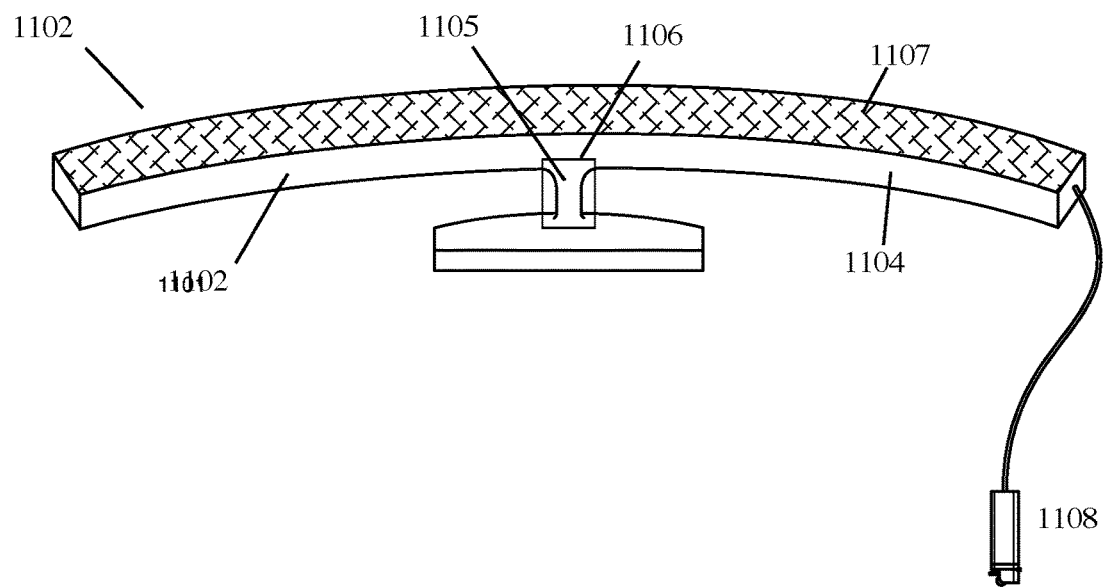

FIG. 11 is a pictorial illustration of an embodiment of the present invention whereby the invention is after-market installation and is mounted on the top of the dash. This version, in its most un-intrusive installation, is not wired directly into the vehicles electrical system and instead is powered via traditional auxiliary power sources, in this case, the ac/cigar lighter power source.

Figure 12:
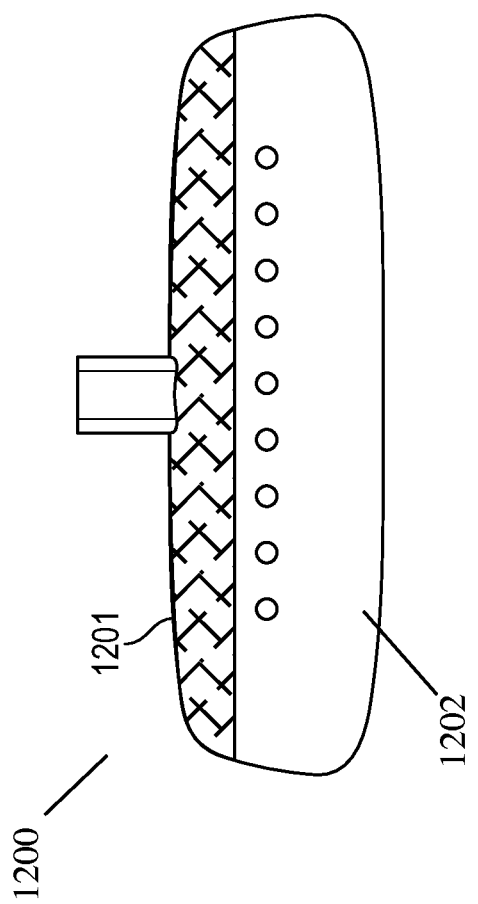

FIG. 12 is a pictorial illustration of an embodiment of the present invention whereby the invention is installed on and a part of the vehicles rear-view mirror and the visual signal lights are factory installed and embedded into the molding of the rear-view mirror which is facing the front windshield.

Figure 13:
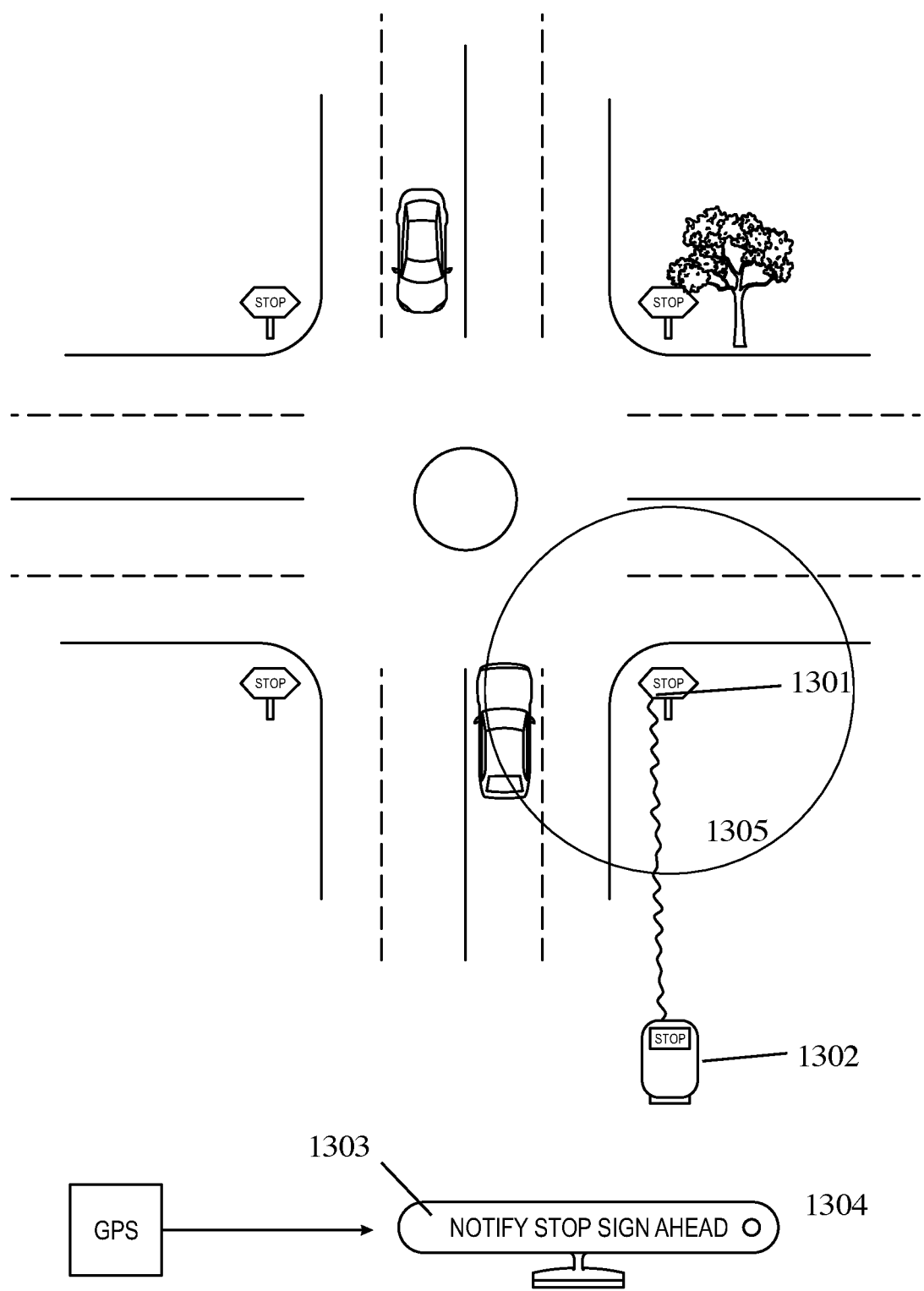

FIG. 13 is a pictorial illustration of an embodiment of the present invention which enables detection of traffic signs that may be obstructed, hidden, or non-obvious and warning instructions are then communicated to the driver.

DETAILED DESCRIPTION

Reference is now made to FIG. 1, which illustrates an apparatus comprising a brake indicator light assembly 105, constructed and operative in accordance with an embodiment of the present invention.

In FIG. 1, the diagram discloses a typical embodiment on the present invention. The apparatus comprises a braking indicator light assembly 105 which includes at least a front facing brake indicator light 103 which is coupled to a brake light master control system 102 which is connected to the vehicles electrical system and mechanically connected to the vehicle 101. Disclosed also is a brake light master control system 102 which responsible for powering and turning on and off both the front face brake indicator light 103 and the rear facing brake indicator light 104. Also disclosed in the diagram is a brake light pedal 106, which when depressed, sends a signal to the brake light master control 102 which responds by powering and turning on and off both the front facing brake indicator light 103 and the rear facing indicator light 104 according to the rules governing the brake light master control system's 102 output to each of these respective lights.

The brake light master control system 102 itself receives input from the brake light pedal 106, but it is also contemplated that input may be received directly from the vehicle cpu 1010, vehicle attached GPS 109, Bluetooth paired GPS 108, object recognition sensors 107, motion sensors 107, or collision detection systems 107 such that if it is anticipated that the vehicle may be coming to a stop, the brake light master control system 102 interacts with and activates the front facing brake indicator light 103 and rear facing brake indicator light 104 regardless of any input from the brake light pedal 106.

In an exemplary embodiment of the invention, both the brake light master control 102 and the front facing brake indicator light 103 are accommodated for and incorporated into the vehicle's design and original assembly. However, it should be understood that it is contemplated that the brake light master control 102 and front facing brake indicator light 103 may, in the alternate, be wired into and attached to the vehicle after factory assembly has occurred. In one embodiment this is accomplished by way of the brake light master control 102 being wired in series in the factory connection that would electrically connect the brake light pedal 106 with the rear facing brake indicator light. In yet another embodiment, the brake indicator light assembly 105 is attached to the vehicle 101 without a modification to the factory assembled wiring and operates as a system without sending output to the vehicle's rear facing brake indicator light 104. In a post-factory embodiment, the front facing brake indicator light 103 itself would necessitate mechanical attachment to fixed front facing position of the vehicle.

In an exemplary embodiment of the invention, the brake light master control 102 sends identical signals to both the front and rear facing brake indicator lights 103 104 as to whether or not to light or not. However, it is contemplated that it may be desirable for the front facing brake indicator light 103 to blink, flash, or send other visual cues or warnings. As such, the brake light master control 102 may also receive input from the brake pedal 106 and other sources and sensors mentioned above and instead operate the front facing brake indicator light 103 and the rear facing brake indicator light 104 such that the state of each light does not necessarily match each other at all times.

Figure 2:
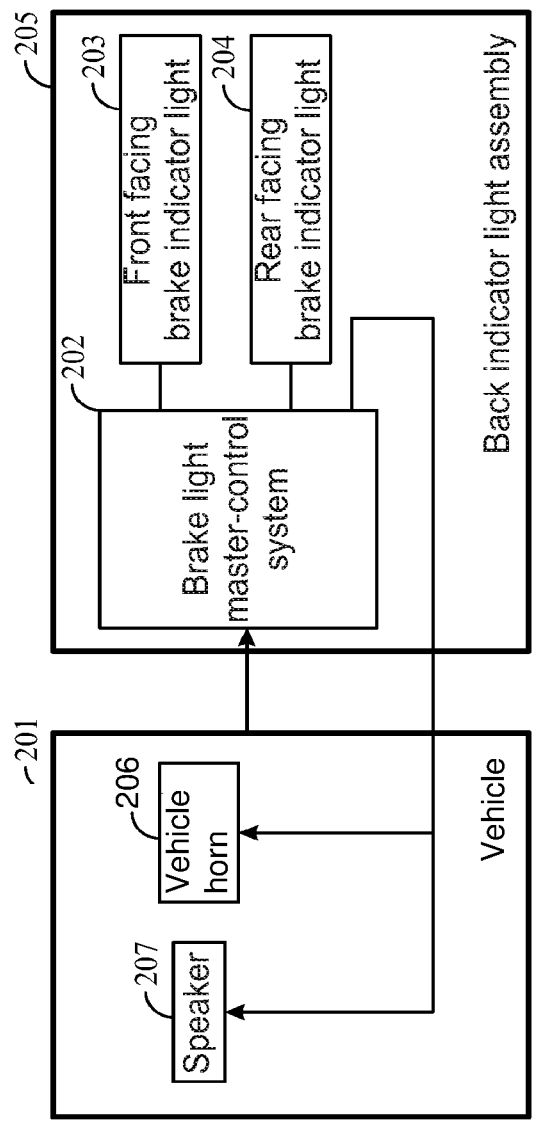
FIG. 2 is a pictorial illustration of currently existing ride-share signage along with mounted smart-phones, meant to illustrate "cabin clutter".

Now referring to FIG. 2, a pictorial illustration of currently existing ride-share signage along with mounted smartphones is shown, illustrating the problem of "cabin clutter" and information bombardment that the invention is meant to alleviate.

Figure 3:
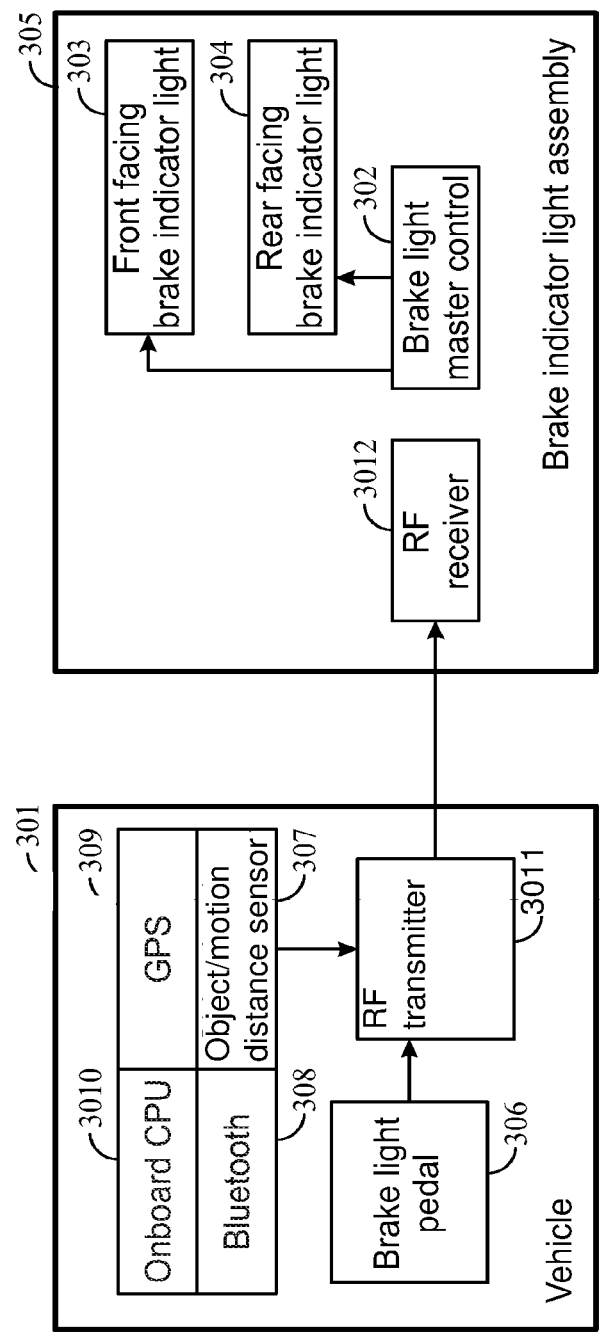
FIG. 3 is a system diagram of FIG. 1. where the brake indicator light assembly further includes the addition of a RC receiver and the addition of a RF transmitter to enable wireless installation and functionality.

Now referring to FIG. 3, the diagram discloses essentially the same system as disclosed in FIG. 1. installed onto a vehicle 301 except that in lieu of the brake light pedal 306 communicating to the brake light master control system 302 by way of a direct electrical connection, communication is now accomplished by way of the addition of a RF transmitter 3011 and a RF receiver 3012. The brake light master control system 302 would continue to function as described above and control the output to the front and rear facing brake indicator lights 303 304. Braking input would be received by the RF transmitter 3011 by way of the brake light pedal 306, vehicle cpu 3010, vehicle attached GPS 309, Bluetooth paired GPS 308, object recognition sensors 307, motion sensors 307, or collision detection systems 307 and then relayed to the RF receiver 3012, which would interact directly with the brake light master control system 302.

While the exemplary embodiment of the invention prefers a design whereby the brake light indicator assembly 305 is directly incorporated into the design and factory installed, it must be considered that it is still desirable to accommodate a quick, simple and un-intrusive installation of the brake light indicator assembly 305.

It must be considered that factory installed safety improvements do nothing to improve the safety of the drivers who do not plan on purchasing a new vehicle in the near future.

As such, it is desirable to enable the invention to be retro-fitted to vehicles that are already manufactured and on the road in a manner such that a consumer may purchase the device and self-install with as little difficulty as possible. Because the electrical systems of vehicles are likely to be the most obvious bottleneck for the installation of an electrically powered aftermarket device, the easiest way to simplify the aftermarket device is to eliminate features of the device that could be directly wired and instead substitute wireless interactivity. A comparable analogy would be aftermarket car alarms, many of which began to simplify the amount of wiring and installation required in order to appeal to consumers that were unwilling or financially unable to pursue professional installation services.

Further, it must also be considered that classic or antique cars electrical systems may be unable to accommodate the present invention such that the contemplated wireless connectivity must be utilized.

Figure 4:
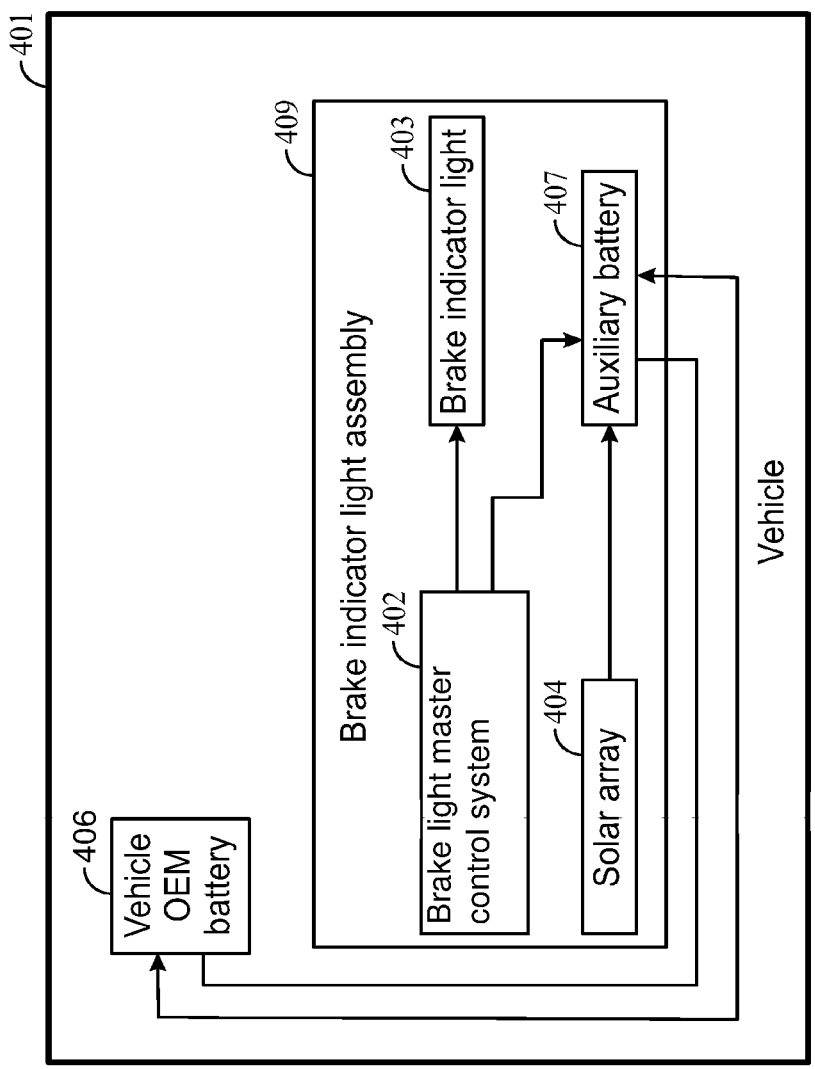
FIG. 4 is a system diagram of FIG. 1. where the brake indicator light assembly further includes the addition of a solar array and an auxiliary battery that may function either independently or in serial with the vehicle's factory installed battery.

Now referring to FIG. 4, the diagram discloses essentially the same system as disclosed in FIG. 1. except that the brake indicator light assembly 405, which includes both the brake light master control system 402 and brake indicator light(s) 403 would additionally now includes a power supply in the form of an auxiliary battery 407 which is separate and distinct from the vehicle's factory installed battery 406, as well as a solar array 404 to facilitate charging this separate battery.

As was similarly contemplated in the discussion of FIG. 3 above, the elimination of professional installation or invasive installation is desirable.

As such, it may be preferable to have the disclosed invention be powered by a battery that is independent of the vehicle's factory installed battery.

This configuration would allow for the invention, in combination with the RF technology disclosed above, to be reduced to distinct physical components that would merely require mechanical attachment by the aftermarket consumer.

However, it may also be desirable to instead wire this auxiliary battery 407 and solar array 404, such that the installation of the brake indicator light assembly 405 to any vehicle would enable a source of emergency power, such that the vehicle could either start from the auxiliary battery 407 in the event of the vehicles main battery 406 failure. Should the output of this auxiliary battery 407 be insufficient to jump start an automobile, it may still operate such that in emergency conditions it would be able to charge small electronics.

This additional functionality would further incentivize vehicle manufacturers and aftermarket adoption.

Figure 5:
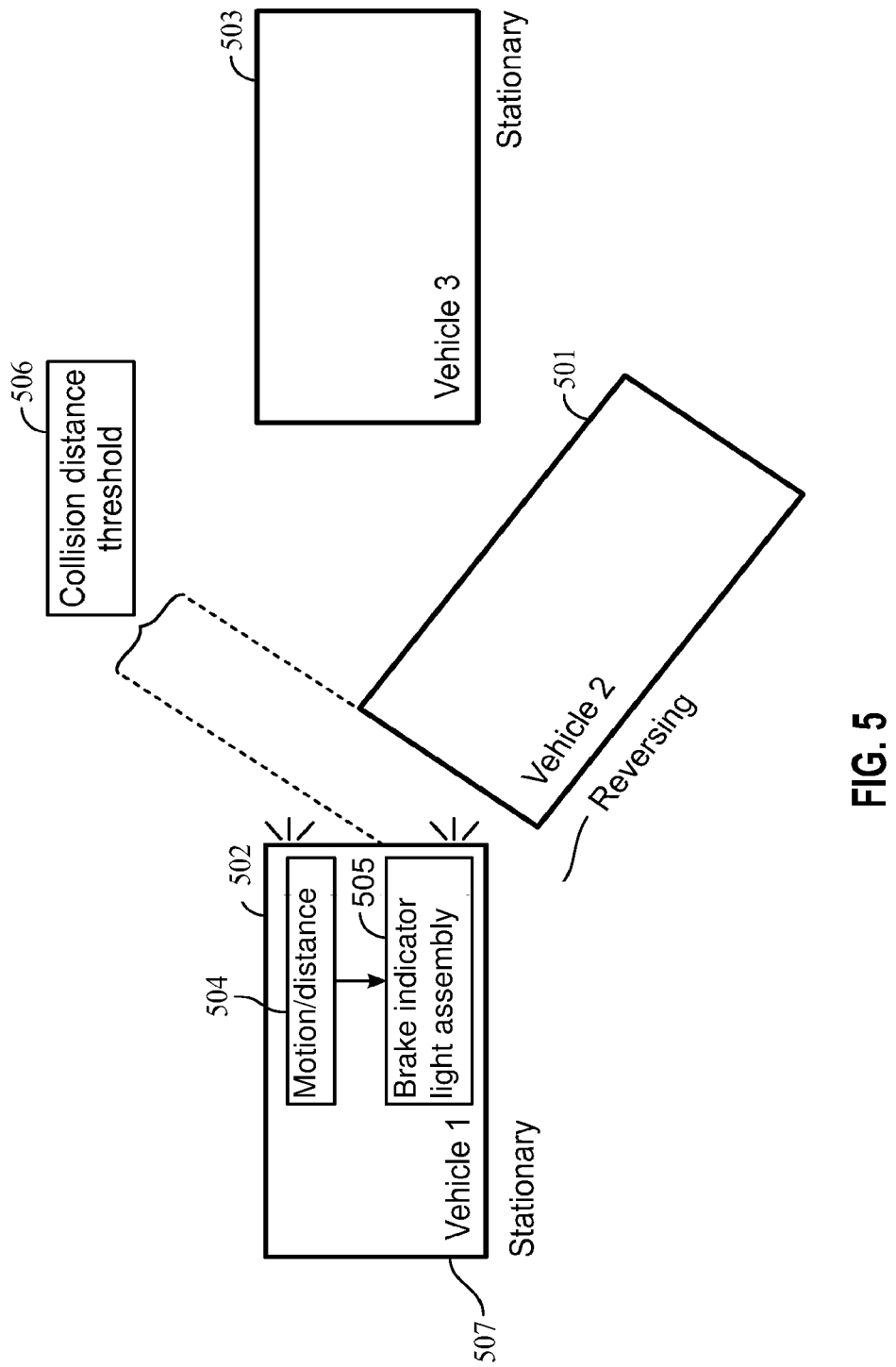
FIG. 5 and FIG. 6 are pictorial illustrations of the present invention enabling additional parking assistance functionality.

Now referring to FIG. 5, the illustration discloses additional functionality of the invention. In particular, it is desirable for motorists who are attempting difficult parking maneuvers to receive warnings in order to avoid collision.

While it is now becoming more commonplace for vehicles to come installed with cameras and/or proximity detectors that sound to facilitate parking, in another embodiment of the invention it is disclosed a method for indicating to drivers a visual indicator that collision is imminent.

In FIG. 5, a parking vehicle 501 is contemplated wherein the driver is attempting to reverse into a parking spot and parallel park between two vehicles 503 507. The disclosed invention is installed 502 on parked vehicle 507. As parking vehicle 501 begins to reverse into the parking spot, parked vehicle 502's motion and/or distance sensors 504 become active. Once parking vehicle 501 is within sufficient distance such that it has crosses a collision distance threshold 506, the motion and/or distance sensors 504 interact with the brake indicator light assembly 505 such that the brake light master control activates the front facing brake indicator light, alerting the parking vehicle 501 that it is too close and needs to stop.

Figure 6:
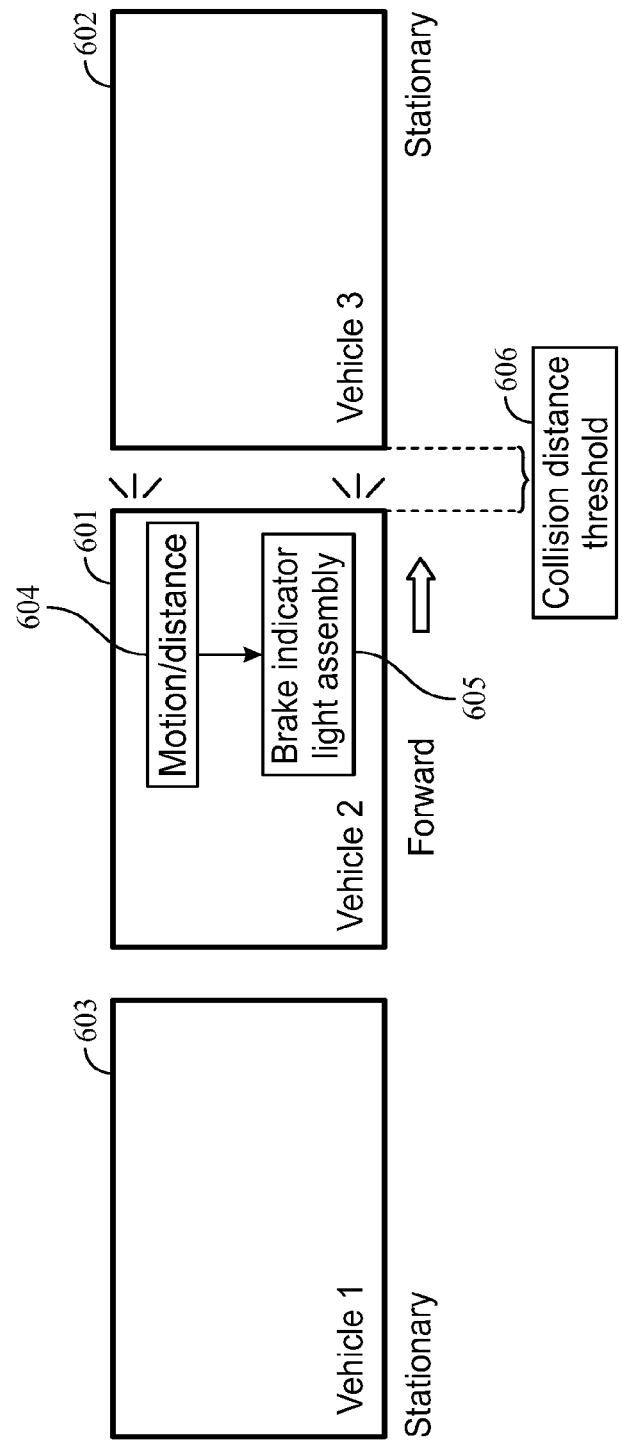

Similarly in FIG. 6, the parking vehicle 601 is now outfitted with the disclosed invention 605 and attempting parking between vehicles 603 602. As in FIG. 5, the same system would indicate to the driver that their vehicle is now dangerously close to colliding with the car directly to the vehicle's front, parked vehicle 602, once the motion and/or distance sensors 604 detected the collision distance threshold 606 had been crossed and collision was imminent.

Now referring to FIG. 7, the diagram discloses essentially the same system as disclosed in FIG. 1. except that the brake indicator light assembly attached to a vehicle 701, which includes the brake light master control system 702 would now additionally include the capability to communicate wirelessly with a user's smartphone 707 by way of a software installed user interface 708 on said phone.

In such an embodiment, it is contemplated, and has been discussed above, that it is likely preferable to minimize the amount of aftermarket wiring that the installation of such a system might require. Further, as has been contemplated and discussed above, the brake light master control system is likely to be receiving input 705 from a multitude of sources, including but not limited to a brake light pedal, the vehicle's onboard gps, a gps system, Bluetooth enabled devices, and a variety of object, motion and distance sensors 704. As such, it is preferable to instead consider the brake light master control system 702 the central hub for all of these received signals and configure the responses of the system directly with the brake light master control system instead of each of these different input sources 704 individually.

It is further considered that the optimal installation point of the brake light master control system 702 may be in a corner of the engine compartment, the trunk, under a seat, or in another location such that the vehicles overall aesthetic is left unchanged. As such, instead of communicating these setting by way of direct physical interaction the brake light master control system 702, instead the user only needs to tune and modify the settings of the system by way of their smart phone 702 and the software 708 installed thereupon.

A user would by way of such an interface would be able to not only tune the output 706 that the brake light master control system would send to the vehicle's braking light but in another contemplated embodiment, use this interface to make configurations upstream 703 to the various input sources 704 as well. Such an embodiment would be preferable as it is both practical and desirable for a user to have access to one interface that controls and configures a multitude of systems as opposed to interacting with each system and device separately when tuning and customizing for their particular purposes.

FIG. 8, illustrates a multitude of contemplated positions for the front facing brake indicator light.

In an exemplary embodiment, the front facing light comprises a unit that is located on the inside of the vehicle, on the top of the dashboard, in the middle of the of the vehicle 801 on top of the dash board and 802 where the lamp is in the middle of the windshield outside of the windshield. In yet another embodiment, the lamps are placed on either side or both sides of the pillar of the windshield. As described above, one aim of the invention is to have a minimal impact on the aesthetic of the vehicle, while incorporating a multitude of features as will be described below into a discreet installation. This of course is balanced against the current headlight and turn-lamp configuration on vehicles, such that it is desirable to locate the light in a location that is easily seen by pedestrians, and one that is unlikely to be confused with other lights.

That said, it may still be desirable to allow for multiple configurations as studies may show that pedestrians are particularly receptive to one configuration over another. Further, vehicle manufacturers may also want to maintain or present a particular aesthetic style with their line of vehicles.

As contemplated, additional lights might be incorporated into and around the vehicles front grill and emblem 80, 806. In an effort to further distinguish the brake light from the current traditionally placed lights on a vehicle, it is contemplated that the light(s) might be placed along the entire bottom of the windshield 807. In the alternative, and in keeping with the theme of minimal impact, it is similarly considered that the unit, instead of being a part of the dash, might instead be incorporated into the rear-view mirror 808. In the embodiment 808 displayed, the lamps are incorporated to the rear view mirror specifically on the rear side for on-going traffic to see.

In an exemplary embodiment, the light utilized LED or similar technology such that the front facing brake indicator light is bright enough to be recognized for purposes of both traffic standards and readability and recognition of pedestrians and other non-motorized vehicle traffic. Further, LED or similar technology has been shown to be a durable light source that can last for more light hours than standard filament based light bulbs. Further, LED or similar technology would allow auto manufactures the most convenience and freedom into incorporating into auto body styles as LED or similar technology requires less physical area to occupy. However, it should be understood that traditional vehicle light bulb technology is contemplated, and in the alternative, employed as a substitute.

FIG. 9 is a pictorial illustration of an embodiment of the present invention that indicates the relative location of the invention on the dashboard and describes additional contemplated functionality whereby the invention 902 is built into the dashboard 901 by the manufacturer is able to raise and lower into a recessed portion 903 of the dashboard such that when the car is turned off, the front facing brake light unit 905 will lower into the dash console and be flush with the rest of the dash console. This pictorial illustration also indicates the described solar functionality, such that the solar cells 904 are to be located along the top of the front facing light unit such that in either a raised/on or lowered/off position, the solar cells are still visible and available to receive sunlight and charge the secondary battery 906 which is run in series such that it may provide an emergency auxiliary power source to start the vehicle or be used to power consumer electronics or vehicle functions such as the radio, without drawing from the primary vehicle battery while the vehicle is not on and running.

We next consider a focused view on the front of the front facing light unit itself 906. Here it is considered that the unit might only have the functionality to communicate general warnings or signals by way of a simple light array 908. However, it is considered that it may be desirable to instead use a higher density led array or screen, such that a multitude of colors, messages, or logos may be displayed 907.

This screen display embodiment 907 would be particularly useful in communicating to potential ride-share fares that the vehicle is aligned with a particular company. Further, because the screen is dynamic and updateable, potentially this outward, fare facing signage might serve to indicate that the vehicle is the rider's particular pick-up by way of displaying a name, or something unique that the rider could identify. This particular embodiment becomes increasingly relevant as ride-share programs have now been dealing with the repercussions of unlicensed or unauthorized vehicles masquerading as being part of a particular ride share program, sometimes with tragic consequence to these vulnerable riders. On a more basic level, it would at the very least prevent altercations between multiple riders who have summons pick-up from a particular location as it would be easy to communicate which vehicle is meant for which rider.

Similarly, this same display functionality could be incorporated into an additional screen placed on the driver facing portion of the unit. The information displayed to the driver could be step by step navigation directions. Returning to the notion of serving function to ride-share programs, because the unit is centrally located, it is viewable to a passenger as well. The information that would be relevant to display to this passenger could be information such as welcome signage, ride-share and/or driver identification information, advertising, or other visually communicated information.

FIG. 10 is a pictorial illustration of an embodiment of the present invention that indicates the relative location of the invention on the dashboard and describes additional contemplated functionality whereby the invention is built into the dashboard by the manufacturer is able to flip open 1001 instead of raising out of the console with the activation and closes shut, similar to a clam-shell design 1002, with the shut-down of the vehicle.

FIG. 11 is a pictorial illustration of an embodiment of the present invention whereby the invention is after-market installation and is mounted on the top of the dashboard either by the purchaser or by professional installation. This version, in its most un-intrusive installation, is not wired directly into the vehicles electrical system and instead is powered via traditional auxiliary power sources, in this embodiment, the ac/cigar lighter power source 1108.

FIG. 11 also communicates the various orthographic of views, such that it is clear which surfaces of the device face what direction relative to the vehicle. Again, in this aftermarket embodiment version of the device, the same basic functions are considered, such as the solar element 1107 and charging functionality, the necessary outward facing lights 1102. On this particular embodiment, the driver facing surface, 1101, is a flat surface, but in more expensive models, the same functionality of additional lights/screens on this surface could be implemented. As a simple flat surface 1101 however, it is still contemplated that it would be desirable to provide either a surface for a mount, or the mount itself 1105, for a drivers cell phone 1106, such that it is centrally located, and out of the way of the drivers vision. Additionally, this flat surface allows for a surface for identification signage for passenger safety.

This unit also contemplates the inclusion of a GPS device 1104. The including of a GPS device would allow for the capability for the vehicle to more accurately broadcast the vehicle location. This serves many potential purposes. For the driver, it may be useful in locating the vehicle as to its location in a crowded and full parking lot. As to a rider, it may be useful in better locating the vehicle and driver for pickup.

FIG. 12 is a pictorial illustration of an embodiment 1200 of the present invention whereby the invention is installed on and a part of the vehicles rear-view mirror and the visual signal lights are factory installed arid embedded into the molding of the rear-view mirror which is facing the front windshield.

In this particular embodiment, it is contemplated that nearly all of the previously described functionalities are present, with the exception of a driver or passenger facing screen, or phone mount, as the rear view mirror 1202 itself must be preserved on the driver facing surface 1201 of the device. However, this particular embodiment may still be desirable as it achieves perhaps the most minimal impact on the vehicles overall aesthetic.

FIG. 13 is a pictorial illustration of an embodiment of the present invention which illustrates an embodiment that contemplates the detection of traffic signs that may be obstructed, hidden, or non-obvious and warning instructions are then communicated to the driver on the driver facing LED surface of the front facing light unit.

As contemplated, stop signs and other fixed traffic signs could be easily fitted with a beacon 1301. The vehicle itself would be outfitted with a listening receiver 1302. When approaching signage, once the vehicle was within an appropriate triggering radius 1305, the receiver would detect and trigger, then displaying either a non-verbal flashing warning on the driver side facing LED surface 1303 of the front facing light unit 1304. In the alternate, it would be possible to indicate with greater specificity what sort of sign was being approached, and an approximate distance to the sign.

What is claimed:

1. A system to enhance vehicle safety, comprising:
   a. A vehicle having a front end and a rear end; and
   b. At least one visual signal light apparatus positioned in a proximity to said front end of the vehicle;
   c. Said visual signal light apparatus illuminates when said vehicle's is decelerating via its braking system;
   d. wherein said visual light apparatus is comprised of a first body portion wherein said first body portion is comprised of a convex body having a first surface facing the front of the vehicle and a second surface facing the rear of the vehicle a third surface facing a top of the vehicle and a fourth surface facing a bottom of the vehicle wherein at least one or more LED lights is embodied to said first surface and at least one or more solar panels is embodied to said third surface;
   e. wherein said visual light apparatus is comprised of a second body portion wherein said second body portion is comprised of a mount suitable to mount said first body portion to a dashboard of said vehicle.

2. The system of claim 1 wherein said visual signal light is comprised of a power source and a wireless connection module wherein said visual signal light is controlled by said vehicle via said wireless connection module.

3. The system of claim 1 wherein said vehicle is comprised of a central processing unit capable of controlling vehicle functions.

4. The system of claim 1 wherein said visual signal light is comprised of a power source and a wireless connection module wherein said visual signal light is controlled by a smartphone via said wireless connection module.

* * * * *